United States Patent [19]

Weiland et al.

[11] Patent Number: 4,702,442
[45] Date of Patent: Oct. 27, 1987

[54] AIRCRAFT TRAILING EDGE FLAP APPARATUS

[75] Inventors: Richard H. Weiland, Seattle; William L. Franklin, Bothell, both of Wash.

[73] Assignee: The Boeing Company, Seattle, Wash.

[21] Appl. No.: 679,203

[22] Filed: Dec. 6, 1984

[51] Int. Cl.⁴ ............................................. B64C 9/20
[52] U.S. Cl. ................................... 244/216; 244/218
[58] Field of Search ............... 244/212, 213, 214, 215, 244/216, 217, 219, 218

[56] References Cited

U.S. PATENT DOCUMENTS

| | | | |
|---|---|---|---|
| 2,137,879 | 11/1938 | Ksoll | 244/216 |
| 2,146,014 | 2/1939 | Grant | 244/216 |
| 2,908,454 | 10/1959 | Wolff | 244/216 |
| 3,985,319 | 10/1976 | Deant et al. | 244/216 |
| 4,381,093 | 4/1983 | Rudolph | 244/219 |

*Primary Examiner*—Galen Barefoot
*Attorney, Agent, or Firm*—Hughes & Cassidy

[57] ABSTRACT

An aircraft trailing edge flap assembly including a main flap and an aft flap are repositioned by a dual arm rotary actuator. One arm of the rotary actuator repositions the main flap by driving a carriage assembly along a linear track. The other arm of the rotary actuator repositions the aft flap by driving a bell crank assembly which is operatively connected to an aft flap support member extending downward from the aft flap. The aft flap support member is operatively connected to a main flap support member which extends downwardly and rearwardly from the rear portion of the main flap to operatively connect with a mounting member extending downwardly and rearwardly from the track so that the track mounting member supports the majority of aerodynamic load forces applied to the flap assembly. Both arms of the rotary actuator rotate together through a predetermined arc so that the aft flap and main flap remain in a nested configuration. The main flap rotary arm engages a stop pin resulting in the aft flap rotary arm continuing to rotate the aft flap an additional amount relative to the main flap.

27 Claims, 13 Drawing Figures

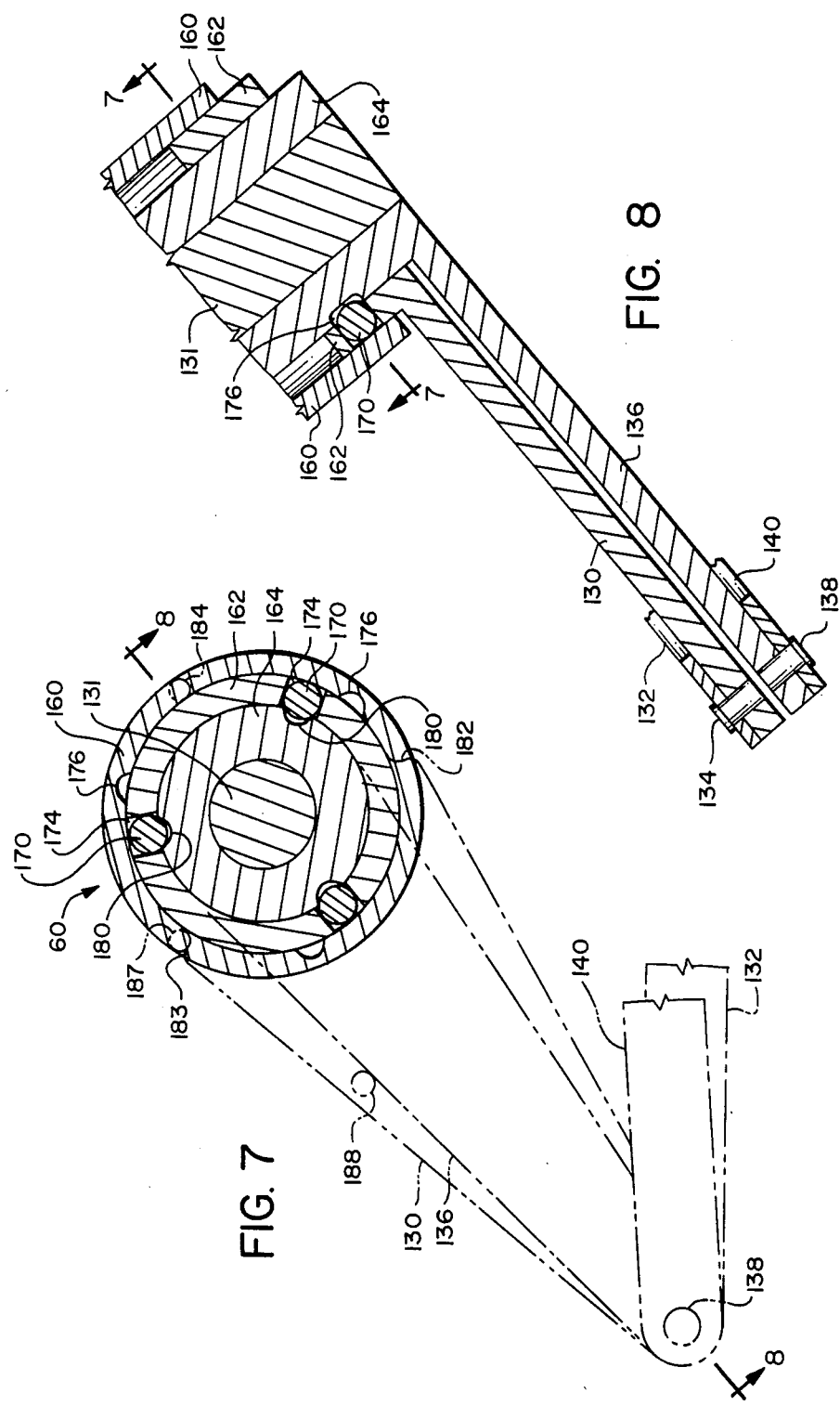

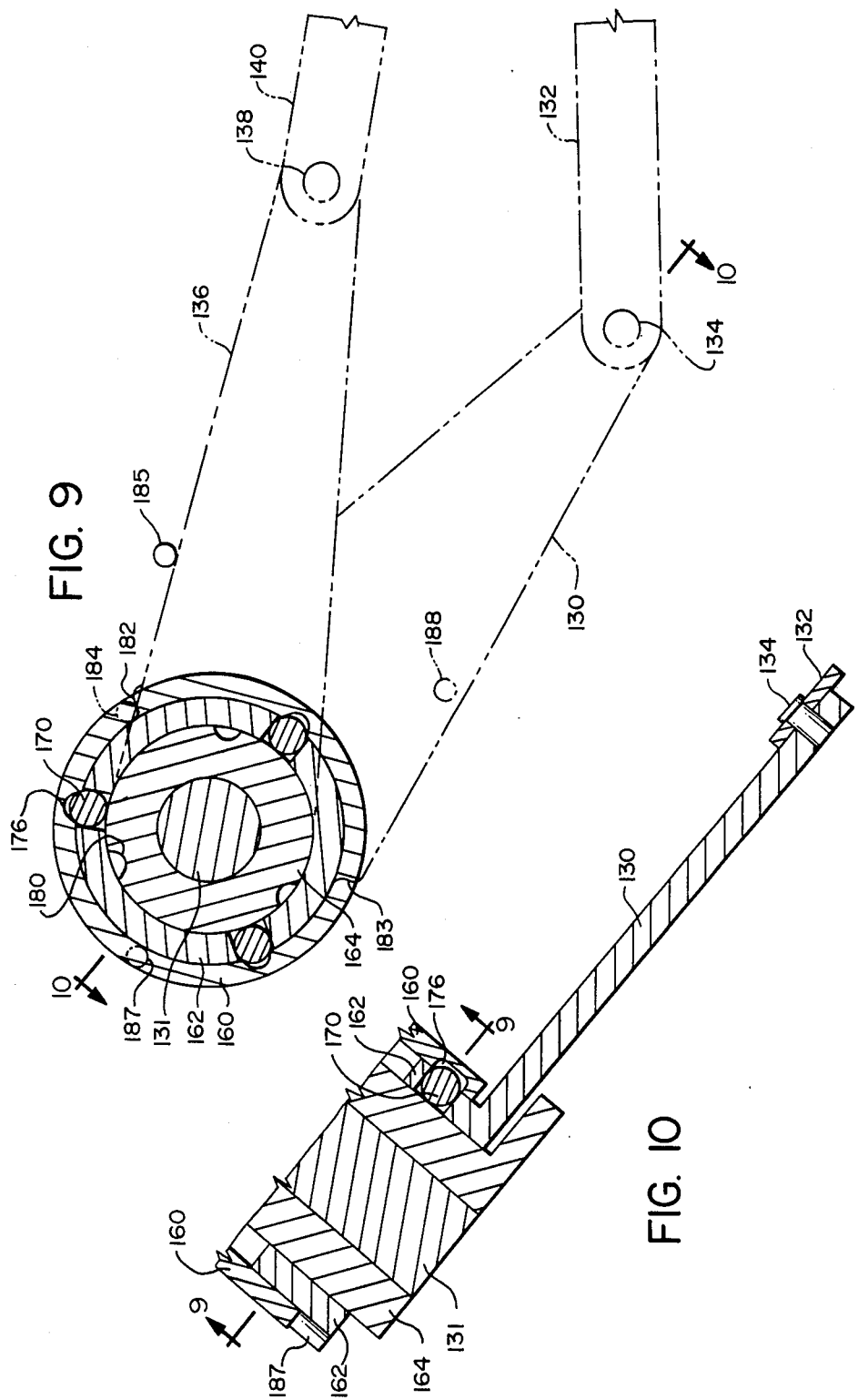

AIRCRAFT TRAILING EDGE FLAP APPARATUS

TECHNICAL FIELD

The present invention relates generally to aircraft trailing edge flaps and flaps sequencing apparatus, and more particularly to a dual flap, fore and aft flap configuration, and a flap sequencing apparatus for positioning the fore and aft flaps in the desired flight configuration.

BACKGROUND OF THE INVENTION

The trailing edge flaps of a high performance airplane have to perform two functions, namely: (a) to provide a high lift-to-drag takeoff configuration; and (b) to provide a high lift coefficient landing configuration. A high lift to drag ratio for takeoff can be accomplished by trailing edge flap position with (a) high Fowler motion (i.e. aft flap motion which increases wing projected area, and (b) small flap deflection angles. The high lift coefficient for landing requires (a) significant Fowler motion, and (b) high flap deflection angles. Theoretically, the best Fowler motion versus flap deflection angle results when the flap initially moves rearwardly with little or no deflection, and at the end of its rearward travel deflects downwardly into the landing configuration.

The mechanism that guided and drives the flaps from the stowed to the takeoff and landing positions is generally located underneath the flaps. It is quite common for present commercial aircraft to have single, double or triple slotted flaps that travel in a curved track to position the flaps in the desired flight configuration. While this arrangement provides optimum flap positions for takeoff and landing using low drag fairings, the flap track supports are heavy and have inherent in-service problems with track wear and jamming.

Typical design problems encountered with flap assemblies for modern jet cylindrical aircraft involve weight, size and complexity. In general, it is necessary to increase the side and weight of flap support components in order to increase the strength of the flap assembly to support heavy aircraft, such as the Boeing 747, which require high lift flaps to land at high gross weights on short runways. The increased weight of the aircraft makes it more expensive to operate in terms of fuel expanded. The increased size of the flap assembly components, some of which are located exterior to the wing and enclosed by aerodynamically "smooth" fairings, results in increased drag which causes increased fuel expenditure and reduced aircraft operating performance. Some short to medium range aircraft are equipped with double slotted flaps, mounted from a single hinge below the wing. This flap configuration is designed to provide very high lift coefficients for landing where takeoff lift coefficients and lift to drag ratios are not critical. To minimize cruise drag, the flap assembly and fairing enclosing it should have a small cross-sectional area.

There is a need, however, for flap systems which have the aerodynamic advantages associated with track guided flap assemblies, yet without the weight, size and serviceablility problems encountered with conventional track guided flap assemblies. Specifically, there are flap assemblies which provide adequate Fowler motion for various flap extensions, while requiring a relatively small flap support fairing to reduce cruise drag. The sophisticated flap motion of these conventional systems is generally accomplished utilizing a complex system of links, tracks and drive assemblies which not only greatly increase the gross weight of the aircraft, but are also more prone to wear and to failure. Some conventional flap assemblies utilize a linear fore and aft track to support a mobile carriage assembly thereon which in turn supports the aircraft flaps. To achieve a high lift flap capable of supporting large aerodynamic loads, the flap assemblies, and particularly the track and support assemblies, must be quite heavy. In addition, to achieve the required flap angles and Fowler motion, it is often necessary to use more than one track and carriage assembly further adding to the overall weight and size (i.e. drag) of the flap assembly. Additional weight comprising a drive mechanism in the form of complex links, gears and cams is added to the aircraft to positon the carriage assemblies along the track and in turn to position the flaps in the desired flight configuration.

In U.S. Pat. No. 3,112,089—Dornier, there is disclosed an airplane wing flap assembly comprising two flaps in a fore and aft configuration which are pivotally rotated between the retracted and deployed positions.

In U.S. Pat. No. 4,434,959—Rudolph, there is disclosed a trailing edge flap assembly comprising a flap member supported by a mobile track which in turn is supported by a stationary mounted slide block.

In U.S. Pat. No. 4,353,517—Rudolph, there is disclosed a trailing edge flap assembly comprising a flap member which is mounted for longitudinal slide motion relative to a fixed mounting structure.

In U.S. Pat. No. 4,381,093—Rudolph, there is disclosed a flap assembly comprising two flaps which are pivotally rotated between the retracted and deployed positions by two four-bar linkages.

Other patents cited in a search conducted in association with preparation of the present application include U.S. Pat. Nos. 2,146,014—Grant; 2,973,069—Morse; 2,584,038—Morrison; 2,137,879—Ksoll; and Italian Patent No. 350,474.

There is needed, therefore, an aircraft flap assembly which provides the desired Fowler motion, which is of reduced weight and size to decrease aircraft gross weight and airfoil drag, and which is relatively simple in order to increase operational reliability.

SUMMARY OF THE INVENTION

Accordingly, it is a general aim of the present invention to provide,an improved wing flap assembly which is characterized by a desirable balance of features relative to simplicity, reduced weight and drag and ease of operation.

In one of its more detailed aspects, the present invention provides a flap apparatus for an airfoil. The flap apparatus comprises a flap assembly located proximate to the rear portion of the airfoil; the flap assembly includes a first flap and a second flap, the second flap positioned generally rearwardly from the first flap. The flap apparatus also includes means for supporting the flap assembly to permit movement of the first flap and the second flap between a first forward stowed position wherein the first flap and the second flap are generally aerodynamcally aligned for cruise operation, a second intermediate position where the first and second flaps are displaced rearwardly from the first position, and a third high lift position wherein the first flap and the second flap are displaced rearwardly and downwardly relative to the chordwise axis of the airfoil. In addition, the flap apparatus includes an actuator means for moving the flap assembly between the first, second and third positions. The actuator means includes: (i) a first arm operatively connected to the main flap by a first linkage means; (ii) a second arm operatively connected to the second flap by a second linkage means; and (iii) arm locating and drive means to cause the first arm and the second arm both to be moved through a first predetermined path segment. Movement of the first arm and the second arm through the first predetermined path segment causes the first linkage means and the second linkage means respectively to move the first flap and the second flap respectively between the first stowed position and second intermediate position. The arm locating and drive means is arranged to cause the second arm to move independently of the first and beyond the intermediate position through a second path segment to cause the second linkage means to move the second flap further relative to the first flap.

The first arm and the second arm may be mounted for rotation about a common axis of rotation. The arm locating and drive means comprise connecting means to interconnect the first and second arms during movement through the first path segment and to release the second arm from the first arm for movement through the second path segment.

The locating and drive means comprises an outer housing, and a first rotary drive means including a first locking ring rotatably engaged within the housing, the locking ring intergrally connected to the first arm. Also included is a second rotary drive means including a second locking ring rotatably engaged within the first locking ring, the second locking ring integrally connected to the second arm. A locking member is movable between: (i) a first location wherein the locking member is engaged with the first locking ring and the second locking ring during the first predetermined path to cause the first locking ring to rotate with the second locking ring in the outer housing thereby causing the first locking arm to rotate with the second locking arm through the first predetermined path; and (ii) a second location wherein the locking member is engaged with the housing to prevent further rotation of the first locking ring within the housing; the locking member being disengaged from the second locking ring so that the second locking ring rotates independently of the first locking ring thereby allowing the second arm to rotate through the second predetermined path.

The flap support means comprises a support member extending downwardly from the second flap, and a support member extending downwardly from the first flap; the first flap support member being operatively connected to the second flap support member. A support member extends downwardly from the airfoil where a first connecting arm operatively connects to the airfoil support member and to the first flap support member respectively. The first connecting arm is operatively connected to the airfoil support member at a location proximate to the center of aerodynamic load forces acting against the flap assembly when the flap assembly is in a position downward and rearward relative to the chordwise axis of the airfoil. The first linkage means comprises a mobile member slidably engaged to the airfoil and operatively connected to the first flap. A connecting arm is operatively connected to the first flap and to the mobile member respectively, the rotation of the first arm moving the mobile member which in turn moves the first flap between the stowed position, intermediate position and high lift position.

The second linkage means comprises an intermediate arm operatively connected to the first flap. A connecting arm is operatively connected to the second flap support member and to the intermediate arm respectively. A driving arm is operatively connected to the second arm; the driving arm is also operatively connected to the intermediate arm between the connection point of the intermediate arm to the first flap and the connection point of the intermediate arm to the second flap connecting arm such that the rotation of the second arm causes the driving arm to move the intermediate arm which in turn causes the connecting arm to move the second flap.

The rotary actuator includes a cylindrical housing, enclosing therein a cylindrical locking ring integrally attached to the main flap rotary arm, the locking ring including a plurality of radial passageways, each containing a locking ball therein which projects outside the passageways either: (i) to engage an arcuate recess on the outer surface of a cylindrical aft flap locking ring, the aft flap locking ring rotatably engaged within the main flap locking ring, to couple the aft flap arm to the main flap arm, or (ii) to engage an arcuate recess on the inner surface of the housing to couple the main flap arm to the housing allowing the aft flap arm to rotate independently of the main arm.

In another embodiment, the double arm rotary actuator is replaced by a single arm rotary actuator having pivot connectors radially displaced relative to one another which connect to the carriage assembly and to the bell crank assembly, respectively, via connecting rods. The differential radial displacement of the pivot connectors results in a different radius of rotation therebetween which causes a faster rate of movement of the aft flap relative to the main flap.

In this embodiment of the present invention there is provided a flap apparatus for an airfoil comprising a flap assembly located proximate to the rear portion of the airfoil; the flap assembly including a first flap and a second flap wherein the second flap is positioned generally rearwardly from the first flap. The flap apparatus also includes means for supporting the flap assembly to allow movement of the first flap and the second flap between a first forward stowed position wherein the first flap and the second flap are generally aerodynamically aligned for cruise mode of operation, a second intermediate position wherein the first and second flaps are displaced downwardly and rearwardly from the first position, and a third position wherein the first flap and the second flap are displaced downwardly and rearwardly from the second intermediate position. The flap apparatus also includes rotary actuator means for repositioning the flap assembly between the first, second an third positions. The rotary actuator means includes an actuator arm operatively connected to the first flap by a first linkage means, the first linkage means connected to the actuator arm at a first connector location. The actuator arm is also operatively connected to the second flap by a second linkage means, the second linkage means connected to the actuator and at a second connector location. The first connector location is located radially inboard of the second connector location so that rotation of the actuator arm causes the second connector location to rotate through a larger radius than the first connector location to move the first flap and the second flap between the first, second and third positions.

DESCRIPTION OF THE DRAWINGS

These and other objects and advantages of the present invention will become more readily apparent upon reading the following detailed description and upon reference to the attached drawings, in which:

FIG. 7 is a sectional side view of the dual arm rotary actuator assembly showing the relative positions of the rotary actuator arms when rotated between the stowed configuration through a first predetermined arc;

FIG. 8 is a sectional top view of the dual arm rotary actuator taken along line 8—8 in FIG. 7;

FIG. 9 is a sectional side view of the dual arm rotary actuator showing the relative positions of the rotary actuator arms when rotated through a second predetermined arc;

FIG. 10 is a sectional top view of the dual arm rotary actuator taken along lines 10—10 in FIG. 9;

Figure 1:
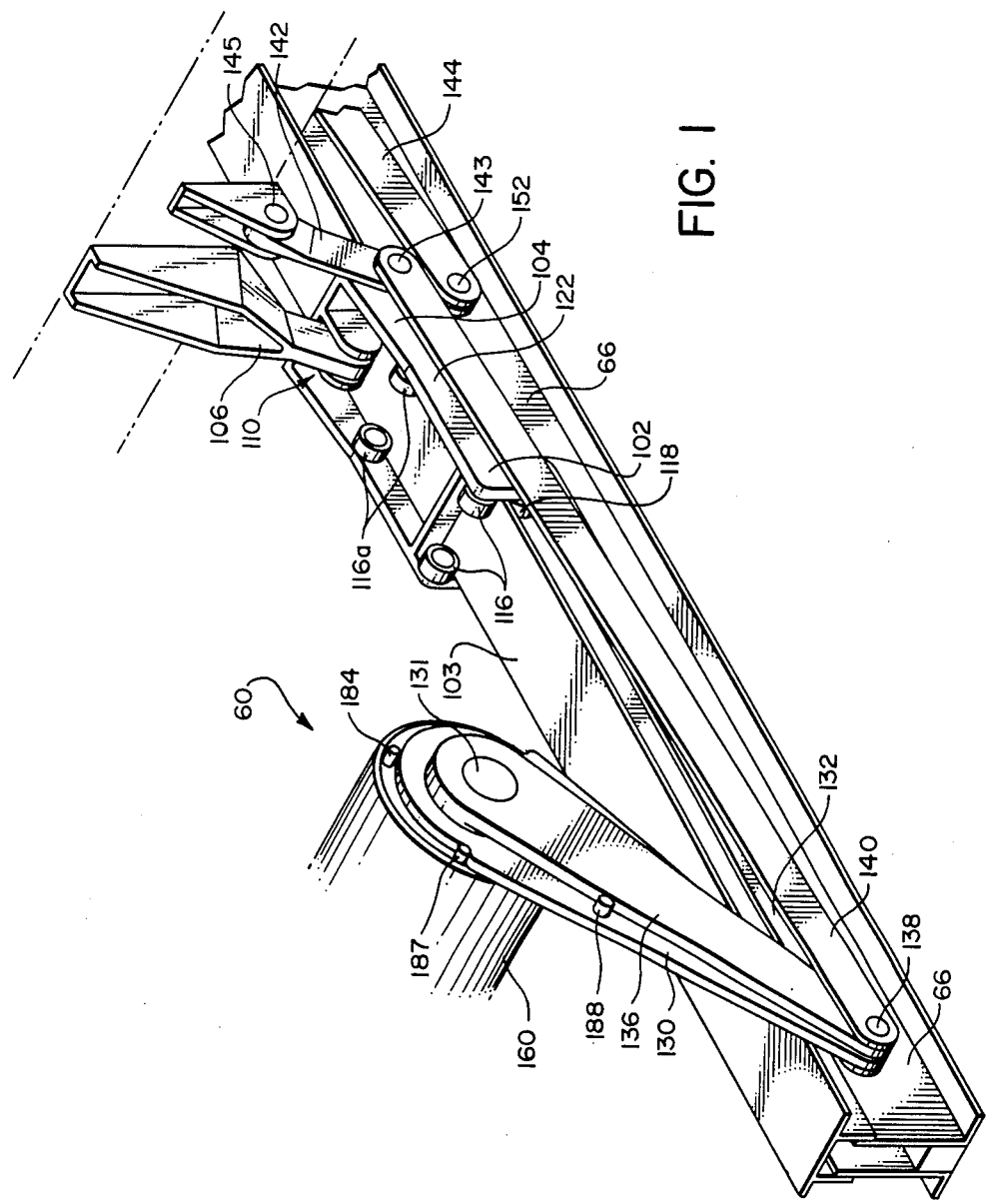
FIG. 1 is a perspective view of an aircraft trailing edge flap assembly showing a dual arm rotary actuator and linkage assembly.

While the present invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the invention is intended to cover all modifications, equivalents and alternatives falling within the spirit and scope of the invention.

DETAILED DESCRIPTION OF THE INVENTION

Referring to FIGS. 1 through 4, there is shown a wing indicated at 20, a dual flap assembly indicated at 32, a dual arm actuator assembly indicated at 60, a linkage assembly indicated at 62 and a support assembly indicated at 63. Briefly, flap assembly 32 is repositioned between a stowed configuration illustrated in FIGS. 1 and 2, one of many possible intermediate configurations illustrated in FIG. 3, and a fully extended configuration illustrated in FIG. 4, by dual arm rotary actuator assembly 60 which rotates in a counterclockwise direction to propel a mobile carriage 100 and various pivotally mounted linking arms, drive rods, connecting arms to reposition flap assembly 32 from the stowed position to the intermediate and fully extended positions.

Figure 2:
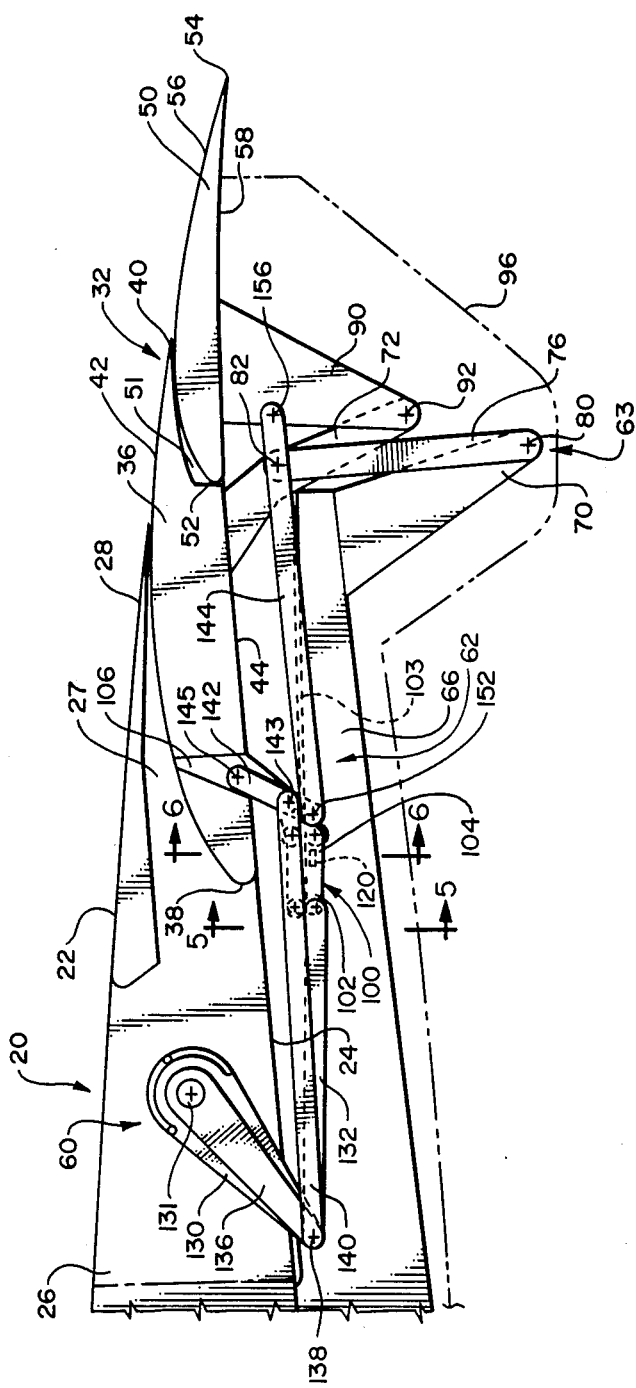
FIG. 2 is a side view of the dual arm rotary actuator, flap assembly, linkage assembly, and support assembly in a stowed configuation.

Referring now to FIGS. 1 and 2, there is shown a trailing edge portion of an aircraft wing indicated at 20 including an upper surface 22, a lower surface 24, a forward trailing edge portion 26, and a rear trailing edge portion 28. In order to provide additional aerodynamic lift to wing 20 during takeoff, landing or other slow speed flight conditions, a trailing edge flap assembly indicated at 32 is located at rearward portion 28 of wing 20. FIGS. 1 and 2 illustrate flap assembly 32 in the retracted or stowed configuration which is the optimum flap configuration for aircraft cruising. Trailing edge flap assembly 32 includes a main flap 36 having a leading edge 38, a trailing edge 40, an upper surface 42 and a lower surface 44. A forward portion of main flap 36 is located in a recessed area.27 located within rear portion 28 of wing 20 to provide a "clean" aerodynamic configuration to wing 20. Positioned to the rear of main flap 36 is an aft flap 50 having a leading edge 52, trailing edge 54, an upper surface 56 and a lower surface 58. A forward portion of aft flap 50 is stowed in a recessed area 51 located in a rear portion of main flap 36 to provide a clean aerodynamic configuration to ring 20; this position of flap 50 relative to flap 36 referred to herein as a "nested" configuration. Upper flap surfaces 42, 52 respectively of main flap 36 aft flap 50, respectively, are aligned with the upper surface 22 of wing 20 in a conventional manner.

Figure 3:
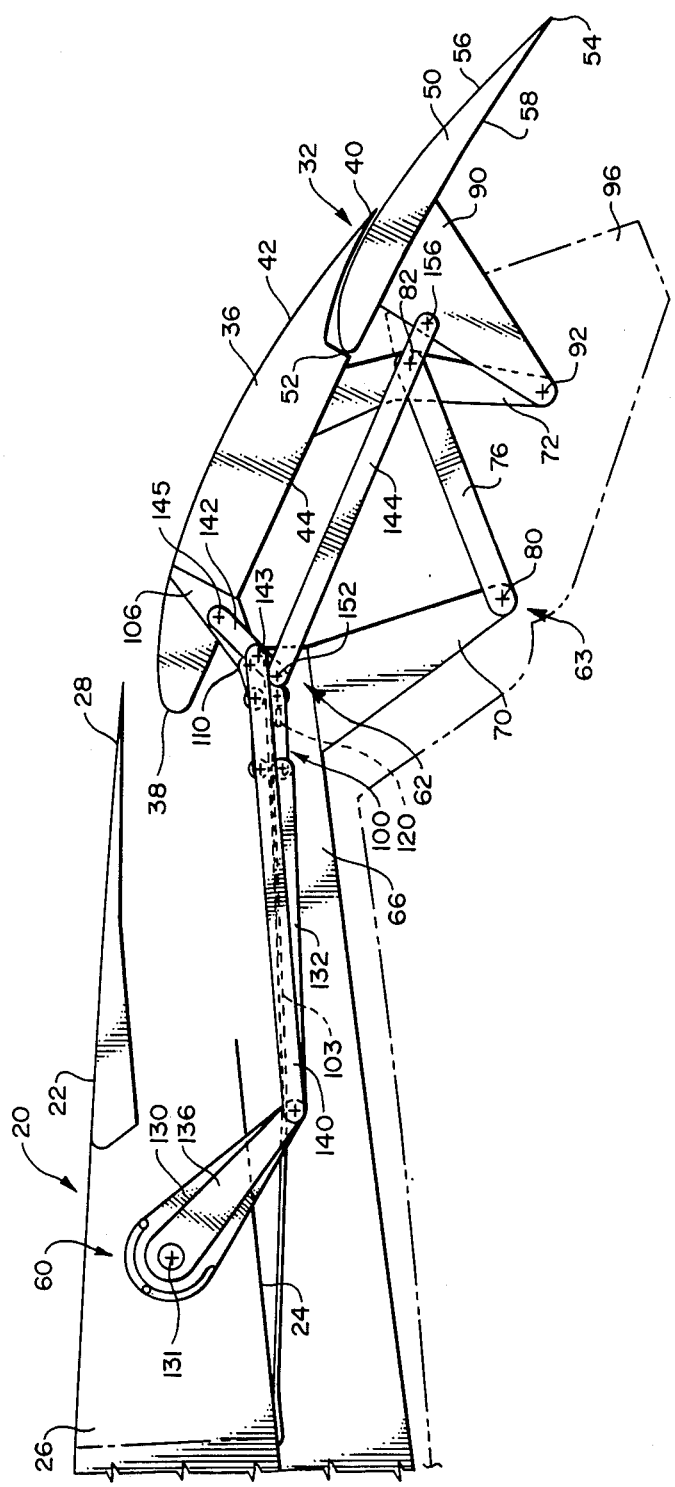
FIG. 3 is a side view of the dual arm rotary actuator, linkage assembly, support assembly and flap assembly in an intermediate configuration wherein the rotary actuator arms have rotated through a first predetermined arc.
Figure 4:
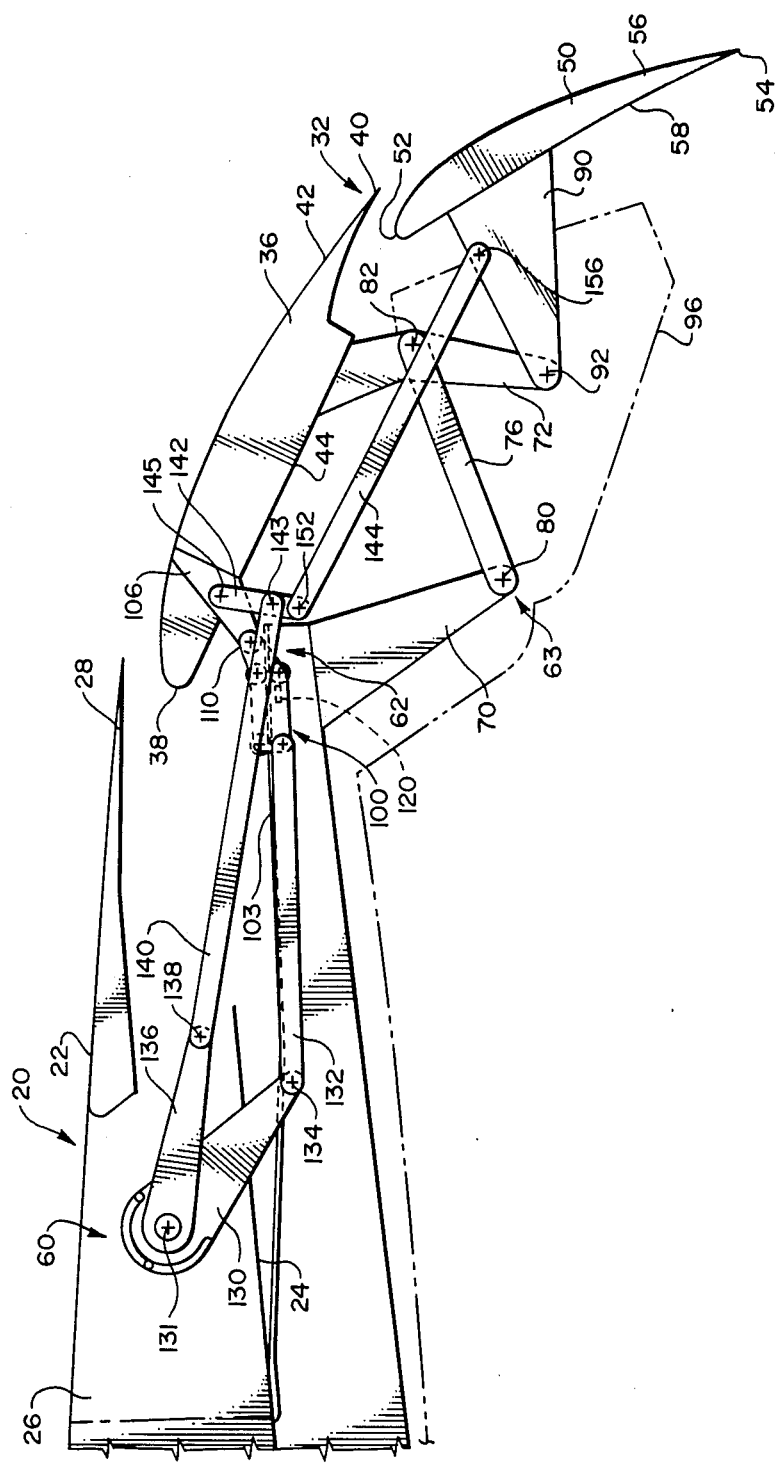
FIG. 4 is a side view of the dual arm rotary actuator, linkage assembly, support assembly and flap assembly in the fully extended configuration.

In order to reposition flaps 36, 50 between the stowed flight configuration illustrated in FIGS. 1 and 2, intermediate flight configuration, such as a takeoff configuration, illustrated in FIG. 3, and the landing configuration illustrated in FIG. 4, a flap sequencing mechanism is provided comprising a rotary actuator indicated at 60 which drives a linkage assembly indicated at 62 which in turn repositions flaps 36, 50 relative to wing 20 in the various flight configurations; flaps 36, 50 upported by a primary flap support assembly indicated at 63. Linkage assembly 62 includes carriage 100 engages to a track 66 located between flaps 36, 50 rigidly secured to wing 20; track 66 extending from wing forward portion 26 rearwardly to wing rearward portion 28.

To provide the majority of support to flaps 36, 50, there is provided a flap support assembly 63 including a mounting member 70 rigidly affixed to track 66 extending downwardly and rearwardly from the lower surface of track 66. Main flap 36 includes a main support member 72 rigidly affixed to the rear portion thereof, support member 72 extending downwardly and rearwardly from lower surface 44 of mail flap 36. To connect main flap support member 72 with mounting member 70 there is provided a linking arm 76 which includes pivot connectors 80, 82 located at opposite ends thereof, pivot connector 80 comprising a self-aligning bearing, pivotally connected to the distal end of track mounting member 70, and pivot connecter 82 pivotally connected to main flap support member 72 at a location between main flap lower surface 44 and the distal ends of support member 72, the precise location of pivot connector 82 dependent upon the desired configuration of aft flap 50 relative to main flap 36.

It should be appreciated that when flap assembly 32 is in a high lift configuration, such as a takeoff configuration (FIG. 3) or landing configuration (FIG. 4), the majority of the aerodynamic load forces act against the rearward portion of main flap 36, therefore main flap support member 72 is attached to the aft portion of flap 36 to direct the majority of these aerodynamic forces via linking arm 76 to track mounting member 70.

In order to support aft flap 50, a support member 90 rigidly affixed to lower surface 58 thereof extends downwardly therefrom; the digtal end of support member 90 pivotally connected to the distal end of main flap support member 72 by a pivot connector 92 allowing aft flap 50 to remain nested with main flap 36 until displaced therefrom. Pivot connector 92 comprises a self-aligning bearing. A fairing 96 which surrounds linkage assembly 62 and suppurt assembly 63 provides a clean aerodynamic surface therearound. In order to support fairing section 96, forward section of fairing 96,is connected to airfoil 20, an aft section of fairing 96 is connected to linking arm 76.

In order to reposition flaps 36, 50 between various flight configurations, there is shown in FIGS. 1 and 2 a linkage assembly 62 including a carriage 100 slidably supported on track 66 to allow for movement of carriage 100 between wing for ard trailing edge portion 26 and wing aft trailing edge portion 28 when carriage 100,is propelled by rotary actuator 60. Carriage 100, including a forward end 102 and a rearward end 104, is connected to main flap 36 via a support member 106 which is rigidly affixed at one end thereof to a forward portion of main flap 36 and which extends downwardly from main flap lower surface 44; the distal end of forward support member 106 pivotally connected to carriage aft end 104 by a pivot connector 110. The term "pivot connector" used in the present application may comprise a ball and joint fitting, bearing, or other pivotal apparatus which is known to those of ordinary skill in the art.

Figure 5:
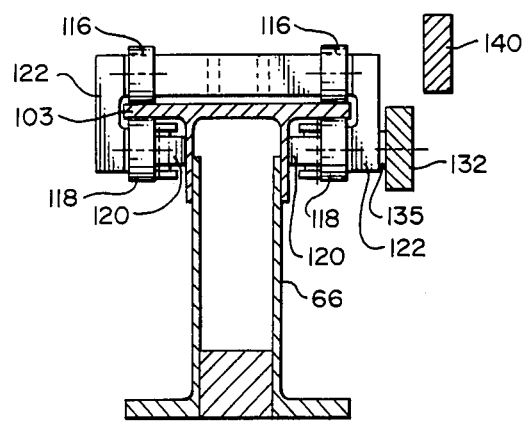
FIG. 5 is an end view of the track and carriage assembly taken along lines 5—5 of FIG. 2 looking rearward at the forward end of the carriage assembly.
Figure 6:
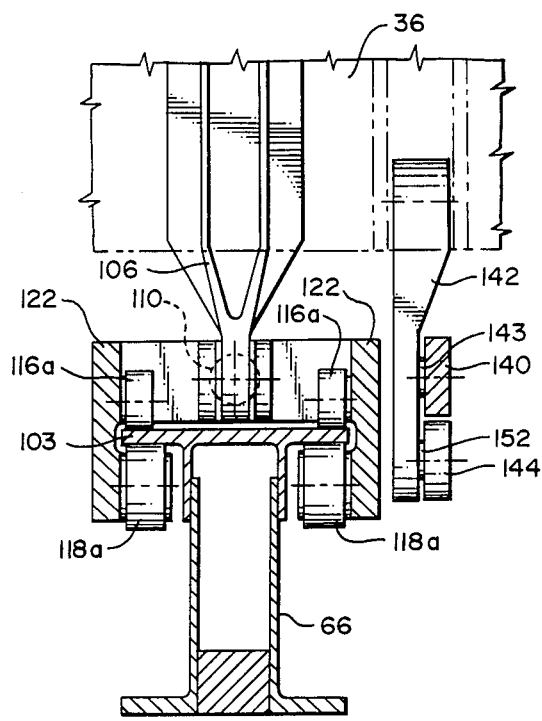
FIG. 6 is a sectional end view of the track/carriage assembly taken along line 6—6 of FIG. 2.

Fore and aft movement of carriage 100 is guided by track 66 which, as illustrated in FIGS. 5 and 6, has an "I" frame configuration; track 66 sloped slightly downwardly in the fore to aft direction to provide sufficient clearance between main flap 36 and wing 20 when main flap 36 is repositioned from the stowed configuration to an intermermediate or landing configuration. The top of track 66 includes a support flange 103 which is engaged in the vertical direction at forward carriage portion 102 by two upper carriage rollers 116 having respective axes of rotation lying in the vertical plane and located at opposite sides of flange 103, and by two lower carriage rollers 118 having respective axes of rotation lying in the horizontal plane. Rollers 116, 118 contact support flange 103 at opposite surfaces thereof to reposition main flap 36 and to provide support to main flap 36 via carriage 100 and support member 110 when main flap 36 is subjected to aerodynamic load forces. It should be appreciated that support flange 103 is made of a strong material, such as steel, to provide support to carriage 100, whereas the remainder of track 66 may be fabricated from a lighter weight material since strength is not as critical in the remaining portion of track 66. To guide carriage 100 along track 66, carriage 100 includes side rollers 120, located at opposite sides of flange 103, the rotational axes of side rollers 120 lying in the horizontal plane. Rollers 116, 118, 120 are rotatably attached to a carriage frame 122 which includes a conventional structure to allow rotational movement of rollers 116 through 120 therein. As illustrated in FIG. 6, the rearward portion 104 of carriage 100 includes a second set of vertical rollers 116a, 118a, lower carriage rollers 118a sized larger than upper rollers 116a due to their proximity to main flap support member 106 and the aerodynamic forces acting thereon.

Referring again to FIGS. 1 through 4, in order to propel carriage 100 along track 66 to reposition main flap 36 as well as to repositon aft flap 50 in sequence therewith, there is provided a rotary actuator 60 including an arm 130 mounted at the proximal end thereof to a torque shaft 131 which is rotated by a hydraulic motor (not shown) via a reduction gear (not shown). Arm 130 is connected to carriage 100 via a connecting rod 132. One end of connecting rod 132 is pivotally connected to the distal end of rotary arm 130 by pivot connector 134, and the other and of connecting rod 132 is pivotally connected to carriage frame 122 at carriage forward portion 102 by pivot connector 135.

Rotary actuator 60 also includes rotary arm 136 mounted on torque shaft 131, axially displaced outboard from inner arm 130 along torque shaft 131. Arm 136 is connected to aft flap 50 by a drive rod 140, a linking arm 142 and a connecting arm 44. One end of drive rod 140 is pivotally connected to the distal end of arm 136 by pivot connector 138, whereas the other end of drive rod 140 is pivotally connected to a linking arm 142 by pivot connector 143 located in proximity to the distal end of linking arm 142. The opposite end of linking arm 142 is connected to the front portion of wing flap 36 by pivot connector 145. Connecting aft flap 50 with linking arm 142 is connecting arm 144, one end of which is pivotally connected to the distal end of linking arm 142 at a pivot connector 152 located radially outboard of pivot connector 143, the other end of linking arm 144 pivotally connected to aft flap support member 90 by pivot connector 156 at a location between pivot connector 92 and the lower surface 58 of flap 50. The precise location of pivot connector 92 is dependent upon the desired flap geometry; for example, location of pivot connector 92 toward main flap lower surface 44 will decrease the Fowler motion of flap 50 by moving the rotational axis of flap 50 upward.

As mentioned previously, movement of flap assembly 32 is provided by a hydraulic motor (not shown) via a torque shaft 131 and rotary actuator 60. The plane of rotation of actuator 60 is parallel to track 66 to provide a fore and aft linear force to propel carriage 100 and drive rod 140, respectively. When flap assembly 32 is in the stowed configuration, arms 130, 136 are radially aligned at approximately the eight o'clock position. To place flap assembly 32 in an intermediate or climb configuration, rotary arms 130, 136 are joined together in a manner to be described hereinafter and rotated in a counterclockwise direction by shaft 131 through a first predetermined arc, approximately 100° in the present embodiment, at which point the rotation of arm 13 is halted; the counterclockwise rotation of arm 136 continuing beyond the halted position of arm 130 through a second predetermined arc, approximately 30° in the present embodiment, to place flap assembly 32 in the landing configuration.

In order to understand the operation of rotary actuator 60, reference is make to FIGS. 7 and 8 which illustrate the position of rotary arms 130, 136 when flap assembly 32 is in the stowed configuration. Rotary actuator 60 includes an outer cylindrical housing 160, affixed to wing 20, which encloses therein a cylindrical locking ring 162 integrally attached to the proximal end of arm 130. The outer surface of locking ring 162 is in communication with the inner surface of housing 160 in a manner to allow rotation of locking ring 162 within housing 160, the rotational axis of locking ring 162 in axial alignment with the cylindrical axis of housing 160. Locking ring 162 encloses therein a cylindrical locking ring 164 integrally attached to arm 136. The outer surface of locking ring 164 is in communication with locking ring 162 in a manner to allow rotation of locking ring 164 within locking ring 162; the rotational axis of locking ring 164 in axial alignment with rotational axis of locking ring 162. Locking ring 164 engages torque shaft 131 such that torque shaft 131 imparts a counterclockwise rotation to locking ring 164 when torque shaft 131 is rotated by a hydraulic motor (not shown) to reposition flap 32 from the stowed configuration.

In order to couple locking ring 162 to housing 160 or to couple locking ring 162 to locking ring 164, there are provided locking balls 160, located within passageways 174, one locking ball 170 per passageway 174. Passageways 174 are located radially about the circumference of locking ring 162 in communication with housing 160 and locking ring 164 at opposite ends respectively of passageway 174. Housing 160 includes recesses areas 176 about the inner surface thereof to receive locking balls 170 therein. The number of housing recessed areas 176 corresponds to the number of passageways 174/locking balls 170 included in rotary actuator 60. Locking ring 164 includes a plurality of recessed areas 180 about the outer surface thereof to receive locking balls 170 therein, the number of locking ring recessed areas 180 corresponding to the number of locking balls 170/passageways 174 included in rotary actuator 60.

Locking balls 170 have a sufficiently large diameter to occupy the entire portion of passageway 174 along the longitudinal axis thereof as well as to simultaneously occupy either housing recesses areas 176 or locking ring recessed areas 180. FIG. 7 illustrates the configuration of rotary actuator 60 when flap assembly 32 is in the stowed position wherein locking balls 170 occupy recessed areas 180 as well as locking ring passageways 174, the outer end of passageways 174 effectively blocked by the inner surface of housing 160 forcing locking balls 170 into locking ring recesses 180 such that arm 130 rotates together with arm 136 inside of housing 160 when a rotational force is applied to arm 136 by shaft 131. As mentioned previously, arm 136 and arm 130 rotate together through a first arcuate distance of approximately 100° until a notch 182, in the leading edge of arm 130 in proximity to locking ring 162, contacts and is stopped by a stop pin 184 extending perpendicularly from housing 160 in the rotational path of arm 130.

In order to disengage arm 130 from arm 136, housing recesses 176 are aligned with locking ring passageways 174 when arm 130 contacts stop pin 184. Referring now to FIGS. 9 and 10, as locking ring 164 continues to rotate in a counterclockwise direction while locking ring 162 is held stationary, locking balls 170 are pushed into housing recesses 176 by the rotational "cam action" of the outer surface of locking ring 164. Arm 136 continues to rotate an additional second arcuate distance of approximately 30° in the counterclockwise direction until it is stopped by a stop pin 185 projecting from a wing structure (not shown) into the path of arm 136. Reversing the rotational direction of torque shift 130 causes arm 136 to rotate in a clockwise direction until the leading edge of arm 136 contacts a stop pin 188 projecting from the surface of arm 130 perpendicular to the plane thereof in the rotational path of arm 136; the result of which: (i) aligns arm 130 with arm 136 by aligning locking ring recesses 180 with locking ring passageways 174, and (ii) causes arm 130 to rotate with arm 136 such that the rotation of locking ring 162 pushes locking balls 170 into locking ring recesses 180 thereby coupling arm 130 to arm 136 and permitting further clockwise rotation of locking rings 162, 164 within housing 160. Clockwise rotation of arms 130, 136 continues until a notch 183 in the leading edge of arm 130 proximate to housing 160 contacts and is stopped by a stop pin 187 projecting perpendicularly from housing 60 in the rotational path of arm 130. It should be appreciated that rotary actuator 60 has been described in its operation through an exemplary distance of 130° between the stowed and fully extended configuration respectively of flap assembly 32. The rotation of rotary actuator 32 may be stopped by drive shaft 161 at any intermediate position between 0° and 130° to obtain various desired configurations of flap assembly 32.

Referring now to FIGS. 2 through 4, counterclockwise rotation of arm 130 propels carriage 100 via driving rod 132 along track 66 causing main flap 36 to move rearward and away from recessed portion 27 of wing 20 in a Fowler type motion (i.e. movement substantially in the rearward direction), reaching a rearward location where main flap 36 is caused to pivot in a clockwise direction about pivot connector 82 by the clockwise rotation of linking arm 76 about pivot connector 80.

Referring now to FIG. 3, counterclockwise rotation of arm 136 through 100° of travel propels drive rod 140 in a rearward direction causing linking arm 142 to pivot in a counterclockwise direction about pivot connector 145, a force transmitted via linking arm 144 which causes aft flap 50 to move rearward and to pivot about pivot connector 92; aft flap 50 maintaining the same position relative to mail flap 36 because outer rotary arm 136 is coupled to inner rotary arm 130 by locking rings 162, 174 and locking balls 170. As arm 136 continues through 100° of rotation to a maximum of 130° of rotation, the rotational force applied to drive rod 140 pivots linking arm 142 in a counterclockwise direction about pivot connector 145 which in turn applies a clockwise rotational force via linking rod 144 to aft flap support 156 about pivot connector 92 causing aft flap 50 to rotate an additional amount, typically 30°.

It should be appreciated in the present invention that the majority of the aerodynamic load forces are centered about a load vector directed through the aft portion of main flap 36 and the distal end of track mounting member 70 when flap assembly 32 is in the extended position illustrated in FIGS. 3 and 4. Therefore, the primary aerodynamic load bearing members in the present invention are track mounting member 70, linking arm 76, main flap support 72, and aft flap support member 90. In addition, the simplicity of design and reduced profile of rotary actuator 60, linkage assembly 62, and support assembly 63 reduces the overall aerodynamic drag.

Figure 11:
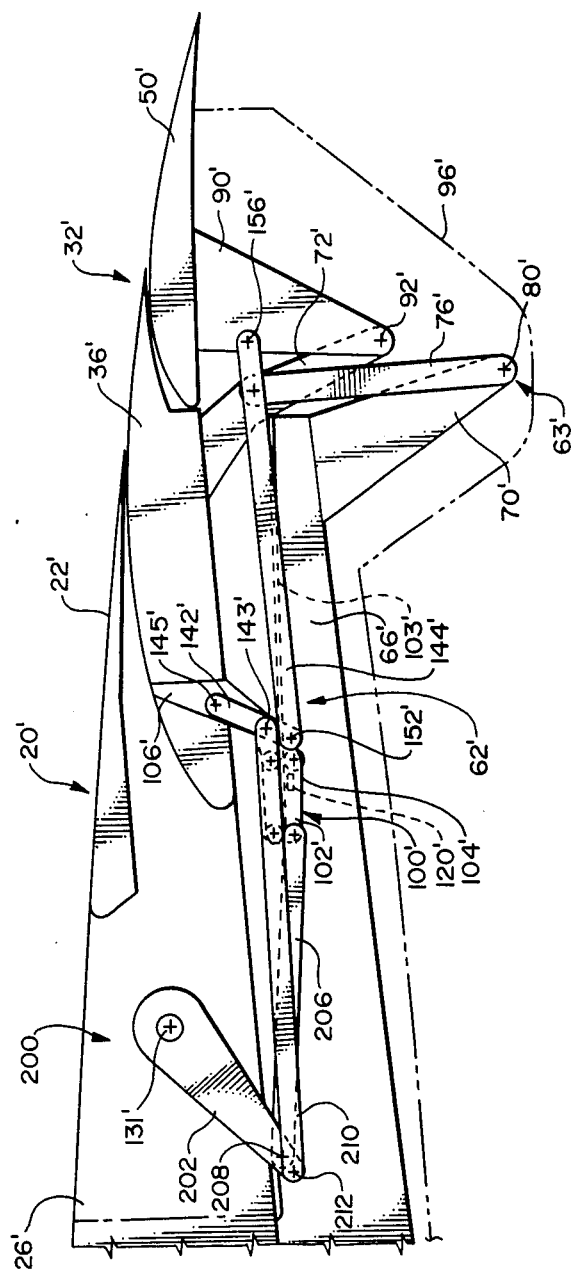
FIG. 11 is a side view of a single arm rotary actuator, linkage assembly, support assembly and flap assembly in the stowed configuration.
Figure 12:
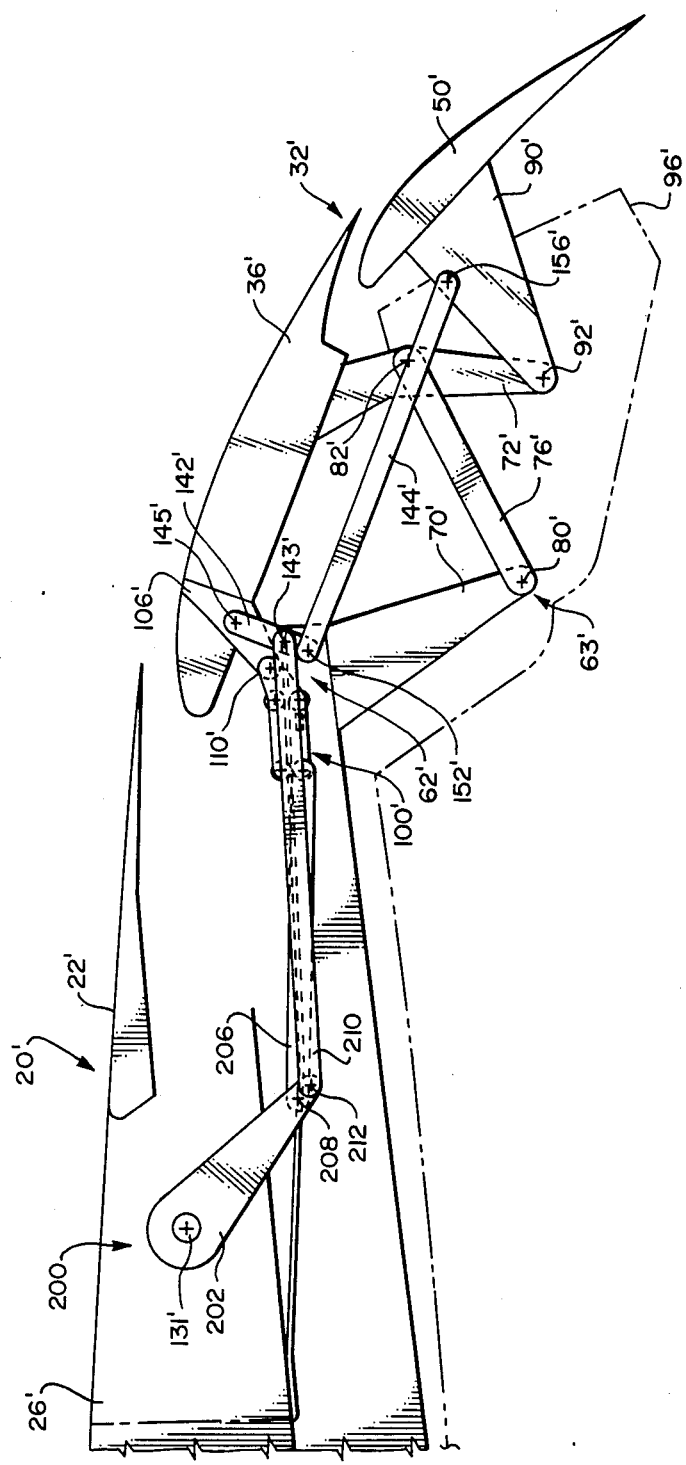
FIG. 12 is a side view of the single arm rotary actuator, linkage assembly, support assembly and flap assembly in one of a plurality of possible intermediate configurations.
Figure 13:
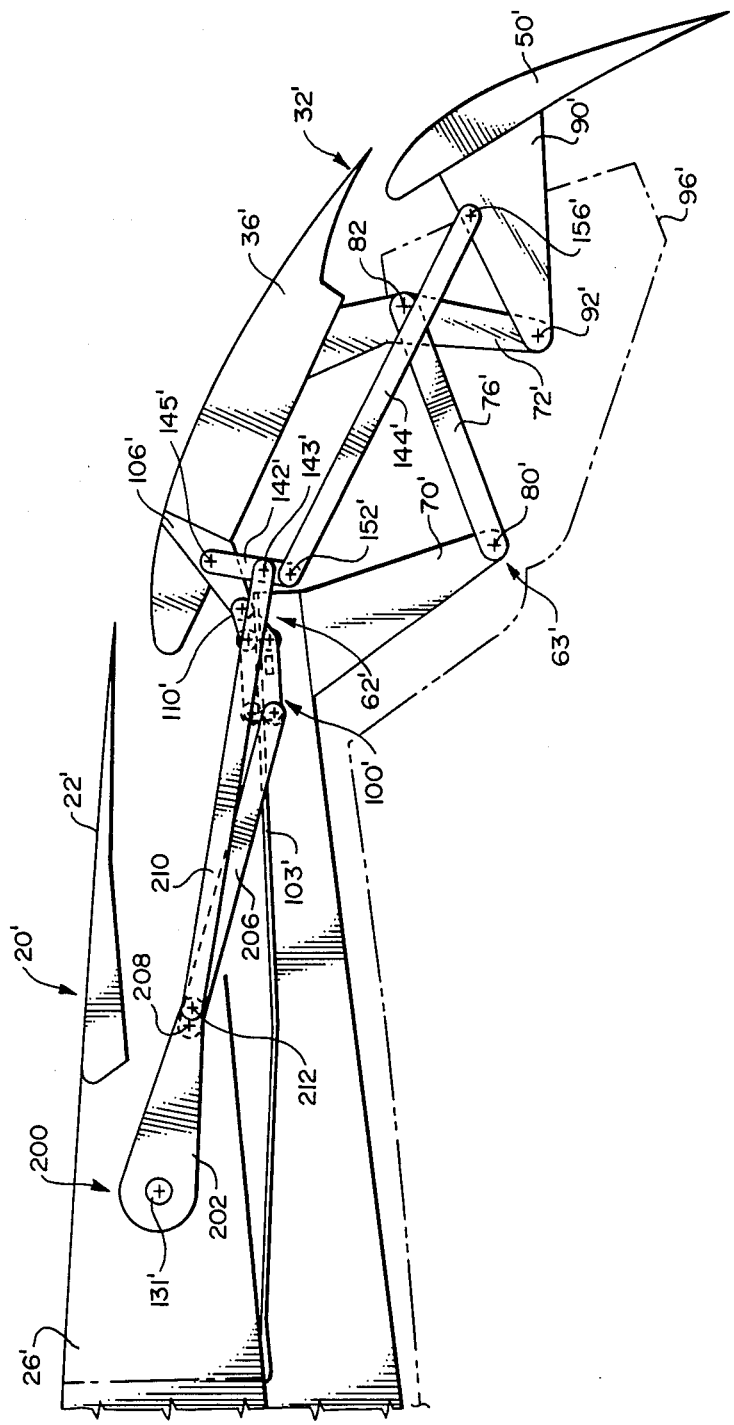
FIG. 13 is a side view of the single arm rotary actuator, linkage assembly, support assembly and flap assembly in the fully extended configuration.

In another embodiment of the present invention illustrated in FIGS. 11 through 13, there is shown a rotary actuator indicated at 200 for repositioning a flap assembly indicated at 32' via a linkage assembly indicated at 62' and a support assembly indicated at 63', assemblies 62', 63' described previously in reference to FIGS. 1 through 10. It should be appreciated that except for rotary actuator 200 and driving rods 206, 210 pivotally attached thereto, elements described previously in reference to FIGS. 1 through 10 are similar to these disclosed in FIGS. 11 through 13, those identical components being identified in FIGS. 11 through 13 by a prime (') symbol. The relative locations of various pivot connectors on their respective support surfaces in the embodiment illustrated in FIGS. 11 through 13 may vary from those pivot connector locations disclosed in the embodiment illustrated in FIGS. 1 through 10 in order to obtain the desired flap geometry.

Referring now to FIG. 11 there is shown a flap assembly 32' in the stowed configuration; flap assembly 32' repositioned to intermediate and deployed configurations by counterclockwise rotation of rotary actuator 200 which in turn drives linkage assembly 62' and support assembly 63' to deposition main flap 36', aft flap 50'. An intermediate flap configuration is illustrated in FIG. 12, and a fully extended configuration illustrated in FIG. 13. It should be appreciated that unlike the embodiment disclosed in FIGS. 1 through 10, in the present embodiment, flaps 36', 50' do not remain nested during extension and retraction, but rather begin to separate immediately as rotary actuator 200 begins the rotate counterclockwise from the eight o'clock position, thus providing a double slotted flap configuration.

Rotary actuator 200 comprises an actuator arm 202 driven by a torque shaft 131' engaging actuator arm 202 at the proximal end thereof. In order to propel carriage 100' along track 66', one end of a drive rod 206 is pivotally connected to rotary actuator arm 202 by pivot connector 208, the other end of drive rod 206 pivotally connected to a forward portion 102' of carriage 100' by a pivot connector (not shown). Counterclockwise rotation of rotary arm 202 repositions aft flap 50' via a drive rod 210 pivotally connected at one end to linking arm 142' a pivot connector 110', drive rod 210 pivotally connected at the other end thereof to the distal end of rotary arm 202 by pivot connector 212 located radially outboard from pivot connector 208 such that pivot connector 212 is rotated through a larger radius with respect to torque shaft 131' than is pivot connector 208. Linking arm 142' is pivoted about pivot connector 145' to pivot aft flap 50' about pivot connector 92' via a drive rod 144' pivotally connected to aft flap support member 90' at pivot connector 156'. Drive rods 206, 210 are pivotally connected to rotary arm 202 at opposite sides thereof to provide an operating clearance between drive rod 206 and drive rod 210.

Operation of rotary actuator 200, linkage assembly 62', support assembly 63', and flap assembly 32' is as follows: As rotary arm 202 rotates in a counterclockwise direction, carriage 100' is propelled along track 66' at a slower rate than drive rod 210' rotates linking arm 142' about pivot connector 145' because pivot connector 208 is rotated through a smaller radius than pivot connector 212. Pivotal movement of linking arm 142' in turn drives a linking rod 144' to reposition aft flap 50' at a faster rate than linear movement of carriage 100' causes rotation of main flap 36' around pivot connectors 80', 82' causing aft flap 50' to be repositioned at a faster rate relative to main flap 36'.

The relative positions of pivot connectors 208, 212 with respect to each other determine the relative rate of movement of aft flap 50' with respect to main flap 36'. Increasing the radial distance between pivot connectors 208, 212 increases the relative rate of movement of aft flap 50' with respect to main flap 36', whereas decreasing the radial distance between pivot connectors 208, 212 decreases the relative rate of movement of aft flap 50' with respect to main flap 36'. Increasing the radial distance of pivot connectors 208, 212 with respect to torque shaft 131', increases the rate of movement of flaps 36', 50' with respect to wing 20'.

It should be appreciated, however, that the simplicity of rotary actuator 200 using differential radial distances along rotary arm 202 to reposition flap assembly 32' results in an effective trailing edge flap assembly wherein the aerodynamic loads are concentrated about pivot connector 80' of track mounting member 70' resulting in a smaller, lighter and a less complex rotary actuator 200, linkage assembly 62' and support assembly 63' resulting in a reduced aerodynamic drag, reduced gross weight and more reliable operation.

What is claimed is:

1. A high lift apparatus for an airfoil, said airfoil having a forward portion and a rearward portion, said high lift apparatus comprising:
    a. a flap assembly located proximate to the rear portion of said airfoil, said flap assembly including a first flap and a second flap, said second flap positioned generally rearwardly from said first flap;
    b. means for supporting said flap assembly to permit movement of said first flap and said second flap between a first forward stowed position wherein said first flap and said second flap are generally aerodynamically aligned for a cruise mode of operation, a second intermediate position where the first and second flaps are displaced rearwardly from the first position, and a third high lift position wherein said first flap and said second flap are displaced rearwardly and downwardly relative to the chordwise axis of said airfoil; and
    c. actuator means, operatively connected to an input drive shaft, for moving said flap assembly between said first, second and third positions in response to a drive input from said drive shaft, said actuator means including:
        (1) a first arm operatively connected to said main flap by a first linkage means,
        (2) a second arm operatively connected to said second flap by a second linkage means, and
        (3) arm locating and drive means, for moving said first arm and said second arm simultaneously through a first predetermined path to cause said first linkage means and said second linkage means, respectively, to move said first flap and said second flap, respectively, between said first stowed position and said second intermediate position, said arm locating and drive means being arranged so that said input drive shaft moves said second arm in a manner independently of said first arm beyond said intermediate position through second path segment to cause second linkage means to move said second flap further relative to said first flap, said arm locating and drive means including means for operatively connecting said first and second arms during movement through said first path segment and for disconnecting said first and second arms for movement of said second arm through said second path segment.

2. The flap apparatus as recited in claim 1, wherein:
    a. said first arm and said second arm are mounted for rotation about a common axis of rotation; and
    b. said arm locating and drive means comprises connecting means to interconnect said first and second arms during movement through said first path segment and to release said second arm from said first arm for movement through said second path segment.

3. The flap apparatus as recited in claim 1 wherein said second flap moves at a rate substantially equal to that of said first flap between said stowed position and said intermediate position.

4. The flap apparatus as recited in claim 1, wherein said locating and drive means comprises:
   a. an outer housing;
   b. a first drive means including a first locking ring rotatably engaged within said housing, said locking ring integrally connected to said first arm;
   c. a second drive means including a second locking ring rotatably engaged within said first locking ring, said second locking ring integrally connected to said second arm; and
   d. a locking member movable between: (i) a first location wherein said locking member is engaged with said first locking ring and said second locking ring during said first predetermined path to cause said first locking ring to rotate with said second locking ring within said outer housing thereby causing said first locking arm to move with said second locking arm through said first predetermined path, and (ii) a second location wherein said locking member is engaged with said housing to prevent further rotation of said first locking ring within said housing, said locking member disengaged from said second locking ring so that said second locking ring moves independently of said first locking ring thereby allowing said second arm to move through said second predetermined path.

5. The flap apparatus as recited in claim 4, wherein said locating and drive means comprises:
   a. an outer housing, the inner surface thereof including at least one recessed area;
   b. a first rotary drive means including a first locking ring rotatably engaged within said housing, said locking ring integrally connected to said first arm, said first locking ring including at least one radial passageway therethrough;
   c. a second rotary drive means including a second locking ring rotatably engaged within said first locking ring, said second locking ring including at least one recessed area on the outer surface thereof, said second locking ring integrally connected to said second arm; and
   d. a locking member located within said first locking ring passageway and movable therewithin between:
      (i) a first location wherein said locking member engages said locking ring passageway and said second locking ring recess during said first predetermined path to cause said first locking ring to rotate together with said second locking ring within said outer housing thereby causing said first locking arm to rotate with said second locking arm through said first predetermined path; and
      (ii) a second location wherein said locking member engages said passageway and said housing recess to prevent further rotation of said first locking ring within said housing, said locking member disengaged from said second locking ring recess so that said second locking ring rotates independently of said first locking ring thereby allowing said second arm to rotate through said second predetermined path.

6. The flap apparatus as recited in claim 5 additionally comprising:
   a. a first means for stopping the rotation said first locking ring relative to said second locking ring in a first rotational direction, said outer housing recess and said second locking ring recess respectively radially aligned with said passageway when said first locking ring has been stopped, said second locking ring continuing to rotate relative to said first locking ring so as to disengage said locking member from said second locking ring recess and to engage said locking member within said housing recess; and
   b. a second means for stopping the rotation of said second locking ring relative to said first locking ring in a second rotational direction opposite to said first rotational direction, said outer housing recess and said second locking ring recess respectively aligned with said passageway when said second locking ring has been stopped, said first locking ring and said second locking ring continuing to rotate relative to said housing so as to disengage said locking member from said housing recess and to engage said locking member within said second locking ring recess.

7. The flap apparatus as recited in claim 6, wherein:
   a. said first arm rotates in a plane radially displaced from the plane of rotation of said second arm;
   b. said first stopping means comprises a member which projects from said housing into the rotational path of said first arm; and
   c. said second stopping means comprises a member which projects from said first arm into the rotational path of said second arm.

8. The flap apparatus as recited in claim 7, additionally comprising:
   a. a third means for stopping the rotation of said first arm and said second arm in said second direction of rotation at the end of said first predetermied path, said third stopping means comprising a member which projects into the rotational path of said first arm; and
   b. a fourth means for stopping the rotation of said second arm in said first direction of rotation at the end of said second predetermined path, said fourth stopping means comprising a member which projects into the rotational path of said second arm.

9. The flap apparatus as recited in claim 8, wherein:
   a. said locking member comprises a spherical member; and
   b. said housing recess and said second locking ring recess are arcuate shaped to receive said spherical member therein.

10. The flap apparatus as recited in claim 1, wherein said flap support means comprises:
    a. a support member extending downwardly from said second flap;
    b. a support member extending downwardly from said first flap, said first flap support member operatively connected to said second flat support member;
    c. a support member rigidly secured to said airfoil, said airfoil support member extending downwardly from said airfoil; and
    d. a first connecting arm operatively connected to said airfoil support member and operatively connected to said first flap support member respectively.

11. The flap apparatus as recited in claim 10, wherein said first connecting arm is operatively connected to said airfoil support member at a location proximate to the center of aerodynamic load forces acting against said flap assembly when said flap assembly is in a position downward and rearward relative to the chordwise axis of said wing.

12. The flap apparatus as recited in claim 1, wherein said first linkage means comprises:
   a. a mobile member slidably engaged to said airfoil, said mobile member operatively connected to said first flap; and
   b. a connecting arm operatively connected to said first flap and to said mobile member respectively, the movement of said first arm moving said mobile member which in turn moves said first flap between the stowed position, intermediate position and high lift position.

13. The flap apparatus as recited in claim 12, wherein:
   a. said airfoil includes a linear track positioned substantially in the fore and aft direction relative to said airfoil; and
   b. said mobile member comprises a plurality of wheel members rotatably mounted to a frame member in the horizontal and vertical planes, said wheel members engaging said track to secure said mobile member to said track in a horizontal and a vertical direction.

14. The flap apparatus as recited in claim 13, wherein said airfoil support member extends downwardly and rearwardly from said track.

15. The flap apparatus as recited in claim 1 wherein said second linkage means comprises:
   a. an intermediate arm opreatively connected to said first flap;
   b. a connecting arm operatively connected to said second flap and to said intermediate arm, respectively; and
   c. driving arm operatively connected to said second arm, said driving arm operatively connected to said intermediate arm in a manner that the movement of said second arm causes said driving arm to move said intermediate arm which in turn causes said connecting arm to move said second flap.

16. A flap apparatus for an airfoil, said airfoil having upper and lower surfaces, a forward portion and a rearward portion, said flap apparatus comprising:
   a. a flap assembly located proximate to the rear portion of said airfoil, said flap assembly including a first flap and a second flap, said second positioned generally rearwardly from said first flap;
   b. means for supporting said flap assembly to permit movement of said first flap and said second flap between a first forward stowed position wherein said first flap and said second flap are generally aerodynamically aligned for a cruise mode of operation, a second intermediate position where the first and second flaps are displaced rearwardly from the first position, and a third high lift position wherein said first flap and said second flap are displaced rearwardly and downwardly relative to the chordwise axis of said airfoil; and
   c. actuator means for moving said flap assembly between said first, second and third positions, said actuator means including:
      (1) a first arm operatively connected to said main flap by a first linkage means,
      (2) a second arm operatively connected to said second flap by a second linkage means, said first arm and said second arm being mounted for rotation about a common axis of rotation,
      (3) arm locating and drive means to cause said first arm and said second arm both to be moved through a first predetermined path segment to cause said first linkage means and said second linkage means, respectively, to move said first flap and said second flap, respectively, between said first stowed position and said second intermediate position, said arm locating and drive means being arranged to cause said second arm to move independently of said first arm beyond said intermediate position through a second path segment to cause said second linkage means to move said second flap further relative to said first flap, and
      (4) said arm locating and drive means comprising connecting means to interconnect said first and second arms during movement through said first path segment and to release said second arm from said first arm for movement through said second path segment.

17. A flap apparatus for an airfoil, said airfoil having upper and lower surfaces, a forward portion and a rearward portion, said flap apparatus comprising:
   a. a flap assembly located proximate to the rear portion of said airfoil, said flap assembly including a first flap and a second flap, said second flap positioned generally rearwardly from said first flap;
   b. means for supporting said flap assembly to permit movement of said first flap and said second flap between a first forward stowed position wherein said first flap and said second flap are generally aerodynamically aligned for cruise mode of operation, a second intermediate position where the first and second flaps are displaced rearwardly from the first position, and a third high lift position where said first flap and said second flap are displaced rearwardly said downwardly relative to the chordwise axis of said airfoil; and
   c. actuator means for moving said flap assembly between said first, second and third positions, said actuator means including:
      (1) a first arm operatively connected to said main flap by a first linkage means,
      (2) a second arm operatively connected to said second flap by a second linkage means,
      (3) arm locating and drive means to cause said first arm and said second arm both to be moved through a first predetermined path segment to cause said first linkage means and said second linkage means, respectively, to move said first flap and said second flap, respectively, between said first stowed position and said second intermediate position, said arm locating and drive means being arranged to cause said second arm to move independently of said first arm beyond said intermediate position through a second path segment to cause said second linkage means to move said second flap further relative to said first flap, and
      (4) said locating and drive means including (i) an outer housing, (ii) a first drive means including a first locking ring rotatably engaged within said housing, said locking ring integrally connected to said first drive arm, (iii) a second drive means including a second locking ring rotatably engaged within said first locking ring, said second locking ring integrally connected to said second arm, and (iv) a locking member movable between a first location wherein said locking member is engaged with said first locking ring and said second locking ring during said first predetermined path to cause said first locking ring to rotate with said second locking ring within said outer housing thereby causing said first locking arm to move with said second locking arm through said first predetermined path, and a second location wherein said locking member is engaged within said housing to prevent further rotation of said first locking ring within said housing, said locking member disengaged from said second locking ring so that said second locking ring moves independently of said first locking ring thereby allowing said second arm to move through said second predetermined path.

18. The flap apparatus as recited in claim 17 wherein said locating and drive means comprises:
  a. an outer housing, the inner surface thereof including at least one recessed area;
  b. a first rotary drive means including a first locking ring rotatably engaged within said housing, said locking ring integrally connected to said first arm, said first locking ring including at least one radial passageway therethrough;
  c. a second rotary drive means including a second locking ring rotatably engaged within said first locking ring, said second locking ring including at least one recessed area on the outer surface thereof, said second locking ring integrally connected to said second arm; and
  d. locking member located within said first locking ring passageway and movable therewithin between:
    (i) a first location wherein said locking member engages said locking ring passageway and said second locking ring recess during said first predetermined path to cause said first locking ring to rotate together with said second locking ring within said outer housing thereby causing said first locking arm to rotate with said second locking arm through said first predetermined path, and
    (ii) a second location wherein said locking member engages said passageway and said housing recess to prevent further rotation of said first locking ring within said housing, said locking member disengaged from said second locking ring recess so that said second locking ring rotates independently of said first locking ring thereby allowing said second arm to rotate through said second predetermined path.

19. The flap apparatus as recited in claim 18 additionally comprising:
  a. first means for stopping the rotation of said first locking ring relative to said second locking ring in a first rotational direction, said outer housing recess and said second locking ring recess respectively, radially aligned with said passageway wehen said first locking ring has been stopped, said second locking ring continuing to rotate relative to said first locking ring so as to disengage said locking member from said second locking ring recess and to engage said locking member within said housing recess; and
  b. second means for stopping the rotation of said second locking ring relative to said first locking ring in a second rotational direction opposite to said first rotation direction, said outer housing recess and said second locking ring recess respectively, aligned with said passageway when said second locking ring has been stopped, said first locking ring and said second locking ring continuing to rotate relative to said housing so as to disengage said locking member from said housing recess and to engage said locking member within said second locking ring recess.

20. The flap apparatus as recited in claim 19 wherein:
  a. said first arm rotates in a plane radially displaced from the plane of rotation of said second arm;
  b. said first stopping means comprises a member which projects from said housing into the rotational path of said first arm; and
  c. said second stopping means comprises a member which projects from said first arm into the rotational path of said second arm.

21. The flap apparatus as recited in claim 20 additionally comprising:
  a. third means for stopping the rotation of said first arm and said second arm in said second direction of rotation at the end of said first predetermined path, said third stopping means comprising a member which projects into the rotational path of said first arm, and
  b. fourth means for stopping the rotation of said second arm in said first direction of rotation at the end of said second predetermined path, said fourth stopping means comprising a member which projects into the rotational path of said second arm.

22. The flap apparatus as recited in claim 21 wherein:
  a. said locking member comprises a spherical member; and
  b. said housing recess and said second locking ring recess are arcuate shaped to receive said spherical member therein.

23. A flap apparatus for an airfoil, said airfoil having upper and lower surfaces, a forward portion and a rearward portion, said flap apparatus comprising:
  a. a flap assembly located proximate to the rear portion of said airfoil, said flap assembly including a first flap and a second flap, said second flap positioned generally rearwardly from said first flap;
  b. means for supporting said flap assembly to permit movement of said first flap and said second flap between a first forward stowed position wherein said first flap and said second flap are generally aerodynamically aligned for a cruise mode of operation, a second intermediate position where the first and second flaps are displaced rearwardly from the first position, and a third high lift position wherein said first flap and said second flap are displaced rearwardly and downwardly relative to the chordwise axis of said airfoil; and
  c. actuator means for moving said flap assembly between said first, second and third positions, said actuator means including:
    (1) a first arm operatively connected to said main flap by a first linkage means,
    (2) a second arm operatively connected to said second flap by a second linkage means,
    (3) arm locating and drive means to cause said first arm and said second arm both to be moved through a firsts predetermined path segment to cause said first linkage means and said second linkage means, respectively, to move said first flap and said second flap, respectively, between said first stowed position and said second intermediate position, said arm locating and drive means being arranged to cause said second arm to move independently of said first arm beyond said intermediate position through a second path segment to cause said second linkage means to move said second flap further relative to said first flap, and (4) said second linkage means including (a) an intermediate arm operatively connected to said first flap, (b) a connecting arm operatively connected to said second flap and to said intermediate arm respectively, and (c) a driving arm operatively connected to said second arm, said driving arm operatively connected to said intermediate arm between the connection point of said intermediate arm to said first flap and the connection point of said intermediate arm to said second flap connecting arm, the movement of said second arm causing said driving arm to move said intermediate arm which in turn causes said connecting arm to move said second flap.

24. A sequenced airfoil assembly comprising:
a. an airfoil assembly including a first airfoil and a second airfoil;
b. means for supporting said airfoil assembly to permit movement of said first airfoil and second airfoil between a first position where said first airfoil and said second airfoil are separated by a first predetermined distance, a second position where said first and second airfoils are displaced from the first position and where said first airfoil and the second airfoil are separated by said first predetermined distance therebetween, and a third position where said first airfoil and said second airfoil are displaced from said second position and said second airfoil is separated from said first airfoil a greater distance than said first predetermined distance;
c. input drive means including a drive member for generating a drive output; and
d. sequencing means for moving said airfoil assembly between said first, second and third positions in response to said drive output, said sequencing means including:
  (1) first arm means whih is operatively connected to said drive member and to said first airfoil,
  (2) second arm means which is operatively connected to said second airfoil, and
  (3) arm locating and drive means for moving said first arm means and said second arm means through a first path segment, and said second arm means independently of said first arm means through a second path segment, said arm locating and drive means including means to interconnect said second arm means to said first arm means for movement of the first and second airfoils between the first position and the second position, and means to disconnect said second arm means from said first arm means for movement of the first and the second airfoils between the second and the third positions.

25. A sequenced airfoil assembly comprising:
a. an airfoil assembly including a first airfoil and a second airfoil;
b. means for supporting said airfoil assembly to permit movement of said first airfoil and said second airfoil between a first position wherein said first airfoil and said second airfoil are spaced apart a first predetermined distance, a second intermediate position where the first and second airfoils are displaced from the first position and where said first airfoil and said second airfoil are separated by said first predetermined distance, and a third position where said first airfoil and said second airfoil are displaced from said second position and said second airfoil is displaced from said first airfoil by a distance greater than said predetermined distance;
c. input drive means including a drive member for generating a dirve output;
d. drive sequencing means which is adapted to receive said drive output and which is operatively connected to said first and second airfoils for regulating movement of said first and second airfoils, in response to said drive output, between said first position, said second position, and said third position, said drive sequencing means including
  (i) arm means having a first arm and a second arm,
  (ii) arm locating and drive means being arranged to have two operational modes including a first operational mode where said first arm and said second arm arm are driven simultaneously through a first prdetermined path, and a second operational mode where said first arm is driven independently of said second arm through a second predetermined path, said arm locating and drive means including means for interconnecting said second arm with said first arm for movement in the first operational mode, and means for disconnecting said second arm from said first arm for movement in said second operational mode, and (iii) said arm means being operatively connected to said first and second airfoils in a manner to move said first and second airfoils between said first, second and third positions.

26. The sequenced airfoil assembly as recited in claim 25 wherein said locating and drive means includes:
a. a first locking ring having a first axis of rotation and being operatively connected to said first arm;
b. a second locking ring having a second axis of rotation coincident with said first axis and being operatively connected to said second arm; and
c. a locking member, movable between (i) a first location wherein said locking member is engaged within said first locking ring and said second locking ring to cause said first locking ring to rotate with said second locking ring, and (ii) a second location wherein said locking member is disengaged from either said first locking ring or said second locking ring to permit said first locking ring to be moved independently of said second locking ring.

27. A sequenced airfoil assembly comprising:
a. an airfoil assembly including a first airfoil and a second airfoil;
b. means for supporting said airfoil assembly to permit movement of said first airfoil and said second airfoil between a first position wherein said first airfoil and said second airfoil are spaced apart a first predetermined distance, a second intermediate position where the first and second airfoils are displaced from the first position and where said first airfoil and said second airfoil are separated by said first predetermined distance, and a third position where said first airfoil and said second airfoil are displaced from said second position and said second airfoil is displaced from said first airfoil by a distance greater than said predetermined distance;

c. input drive means including a drive member for generating a drive output;

d. drive sequencing means which is adapted to receive said drive output and which is operatively connected to said first and second airfoils for regulating movement of said first and second airfoils, in response to said drive output, between said first position, said second position, and said third position, said drive sequencing means including (i) arm means having a first arm and a second arm, (ii) arm locating and drive means being arranged to have two operational modes including a first operational mode where said first arm and said second arm are operatively interconnected so as to be driven simultaneously through a first predetermined path, and a second operational mode where said first arm and said second arm are not operatively interconnected so that said first arm is driven independently of said second arm through a second predetermined path, and (iii) said arm means being operatively connected to said first and second airfoils in a manner to move said first and second airfoils between said first, second and third positions, said arm locating and drive means including (1) a first locking ring having a first axis of rotation and being operatively connected to said first arm, (2) a second locking ring having a second axis of rotation coincident with said first axis and being operatively connected to said second arm, (3) a locking member movable between a first location wherein said locking member is engaged within said first locking ring and said second locking ring to cause said first locking ring to rotate with said second locking ring, and a second location wherein said locking member is disengaged from either said first locking ring or said second locking ring to permit said first locking ring to be moved independently of said second locking ring.

* * * * *